UNITED STATES PATENT OFFICE 2,671,110

SEPARATION OF ISOMERIC MIXTURES OF NITROANILINES

Thomas W. Zbornik and Dean J. Slagle, Charles City, Iowa, assignors to Dr. Salsbury's Laboratories, a corporation of Iowa No Drawing. Application December 14, 1951,
Serial No. 261,926

8 Claims. (Cl. 260—582)

This invention relates to a method of purifying nitroanilines. Its more specific object is the separation of the mixed isomers of ortho- and para-nitroanilines such as accrue in the aminonolysis of chloronitrobenzenes.

In the commercial preparation of ortho- and para-nitroaniline chlorobenzene is first nitrated into the corresponding nitro product whereby a mixture of 65 per cent para-chloronitrobenzene and 35 per cent of its ortho isomer are formed. It has heretofore been common practice to separate the nitrated chlorobenzenes prior to amination in order to secure the ortho- and para-nitroaniline in isolated and purified form. However, this procedure is inconvenient, uneconomical and unsafe. It is carried out by a series of alternate fractional distillations and crystallizations to obtain a gradual enrichment of the para portion in the first fractions and of the ortho isomer in the final distillates. One of the main difficulties of this process resides in the fact that the boiling points of the two isomers are only 6° apart from each other. This necessitates repeated distillations and crystallizations, is a time consuming process and requires a considerable capital expenditure for equipment. Moreover, many industries hesitate to embark upon this project on account of the serious toxicity hazards involved by this procedure, particularly during the summer season.

It is therefore an object of the present invention to devise a method of producing ortho- and para-nitroaniline in isolated state without resorting to the tedious and expensive separation of its chlorinated precursors.

It is a second object of the present invention to produce the isomers in a high degree of purity and without sensible losses in raw materials or reacting agents.

Still another object of the present invention is to design a process for the preparation of ortho- and para-nitroaniline in isolated form which is simple and inexpensive in operation and ensures excellent yields of each constituent of the isomeric mixture.

Other benefits and advantages of the invention will appear from the following description and examples, it being understood, however, that these are not limitative of the scope of the invention, but only illustrative embodiments thereof.

We have found that the necessity of separating isomeric chloronitrobenzenes can be eliminated by a simple and efficient treatment of the aminated derivatives by which the isolation of the para- and ortho-nitroaniline is accomplished. Previous efforts in this direction have resorted to the use of caustic alkali solutions which have been found to possess a selective solvent power for the ortho-isomers within certain elevated temperature limits. It must be considered, however, that the handling of large volumes of hot caustic liquids entails a great deal of inconvenience, hazards, and deterioration due to the corrosive action of the alkaline solutions. Furthermore the effective temperature range of selectivity is confined within relatively narrow limits which are difficult to maintain in commercial operations. Consequently a sharp separation cannot be obtained which makes it impossible to recover pure ortho nitroaniline.

Our new and improved method overcomes these difficulties and shortcomings by making use of the differences in solubility of the two isomeric nitroanilines in various organic solvents and the preferential affinity of acids for the para nitroaniline in the formation of solid salts while the ortho compound remains in solution.

In greater detail, the starting material in our process is a commercial mixture of nitroanilines comprising about 65% of the para derivative and 35% of the ortho isomer. It should be noted, however, that this proportion of isomers is merely illustrative and in no way a critical limitation of this invention, and the composition may of course vary with the source and mode of preparation of the original compounds. When the mixture of the isomers is treated with an organic solvent, such as carbontetrachloride, under suitable conditions, all of the ortho nitroaniline will go into solution while most of the para isomer remains as an insoluble residue. It has, however, been observed that during this operation with rising concentrations of the ortho compound in the solvent the same loses its selectivity and that consequently appreciable amounts of the para derivative are drawn into the ortho nitroaniline solution. These portions of the valuable para compound would be lost from the yield and, moreover, the ortho isomer would not be obtained in purified form, if the separation were to stop short at this stage. After the filtration of the major part of the pure para nitroaniline the filtrate is therefore subjected to a second treatment which will separate the ortho derivative from the associated para fraction. Since no fractional crystallization will yield from this mixture a pure ortho nitroaniline, a different process is applied to produce the desired result.

We have found that if the filtrate is treated with an acid, the para nitroaniline will preferentially be bound by it in form of a solid salt. Thus, if a stream of anhydrous hydrogen chloride is bubbled into the carbontetrachloride solution containing substantially all the ortho nitroaniline and a small proportion of its para isomer, all of the para compound precipitates out in form of its hydrochloride along with some ortho nitroaniline hydrochloride. The solid salts may be either discarded or filtered off, washed with a small amount of organic solvent, neutralized with an alkaline agent and returned to a starting batch for recycling. The filtrate now contains pure ortho nitroaniline which is recovered by any conventional means such as cooling or evaporation. It has been determined that the purity of the resulting ortho isomer largely depends upon the amount of acid added to the filtrate. As a preferable, though not limitative mode of operation, it has been found that an excess over stoichiometric amount required for the neutralization of the para compound should be used in order to assure that all of the para nitroaniline is precipitated. The solvent may be recovered in any convenient manner.

The following examples will further describe the preferred embodiments of our invention by way of illustration. All the parts referred to are to be understood as parts by weight.

Example 1

One hundred parts of a mixture containing 65 per cent of para nitroaniline and 35 per cent of ortho nitroaniline are mixed with 240 parts of carbontetrachloride, and the solution is heated to about 55° C. for approximately ten minutes. The solid portion of the pure para nitroaniline is then filtered off and washed with 60 parts of carbontetrachloride at a temperature of 55° C. A stream of anhydrous hydrogen chloride is then introduced into the filtrate at 55° C. with constant agitation. The precipitate of isomeric nitroaniline hydrochlorides is filtered off, washed with 30 parts of carbontetrachloride which is heated to about 55° C. and neutralized with a solution of sodium hydroxide; it contains a mixture of ortho- and para-nitroanilines which is returned to an original batch for recycling. The carbontetrachloride solution now containing pure ortho nitroaniline is cooled down to about 0° C. and the crystalline precipitate is filtered off and dried. The yields obtained are as follows:

| | Parts |
|---|---|
| Para-nitroaniline (M. P.=146.5° to 147.5° C.) | 62 |
| Ortho-nitroaniline (M. P.=70° C. to 71.5° C.) | 31 |
| Recycle nitroanilines | 6 |
| Unaccounted for loss | 1 |
| | 100 |

Example 2

The isomeric mixture of nitroanilines is treated in the same manner as in Example 1, except that instead of hydrogen chloride, five parts of 98% sulfuric acid are used for the precipitation of the salt mixture containing ortho nitroaniline and a small amount of its para isomer. The nitroaniline sulfates are filtered off, washed with 30 parts of carbontetrachloride and neutralized with a solution of sodium hydroxide to be recycled. The carbontetrachloride solution is cooled to 0° C. and the ortho nitroaniline crystals are filtered off and dried. The yields obtained are as follows:

| | Parts |
|---|---|
| Para nitroaniline (M. P.=146° C. to 147° C.) | 62 |
| Ortho nitroaniline (M. P.=70° C. to 71° C.) | 29 |
| Recycle nitroanilines | 7 |
| Unaccounted for loss | 2 |
| | 100 |

Example 3

This experiment follows the steps in Example 1, with the exception that before the addition of carbontetrachloride to the starting mixture of the isomers 100 parts of water are added. After filtration of the pure para nitroaniline the water layer is decanted and anhydrous hydrogen chloride introduced. The separation is thereupon completed as in the foregoing runs and the yields obtained are as follows:

| | Parts |
|---|---|
| Para nitroaniline (M. P.=146° C. to 147° C.) | 62 |
| Ortho nitroaniline (M. P.=69° C. to 71° C.) | 28 |
| Recycle nitroanilines | 7 |
| Nitroaniline in water layer | 1 |
| Unaccounted for loss | 2 |
| | 100 |

Example 4

The procedure is the same as in Example 1, except that the acid treatment is performed with 9 parts of para phenolsulfonic acid which are added to the first filtrate. The yields obtained are as follows:

| | Parts |
|---|---|
| Para nitroaniline (M. P.=146° C. to 147° C.) | 62 |
| Ortho nitroaniline (M. P.=68.5° C. to 71° C.) | 29 |
| Recycle nitroanilines | 7 |
| Unaccounted for loss | 2 |
| | 100 |

Example 5

One hundred fifty parts of a wet mixture of ortho- and para-nitroaniline containing 35.5 per cent water are added with 120 parts of carbontetrachloride heated to about 55° C. and the solution is then filtered. The remaining solids are resuspended in a second portion of 120 parts of carbontetrachloride, held at 55° C. for about 10 minutes and filtered off. The water layer is thereupon decanted from the filtrate and the carbontetrachloride solution is combined with the first filtrate of the crude ortho isomer and the solution is subsequently treated with anhydrous hydrogen chloride and the process of separation completed as in Example 1. The yields obtained are as follows:

| | Parts |
|---|---|
| Para nitroaniline (M. P.=145° C. to 147° C.) | 61 |
| Ortho nitroaniline (M. P.=68.5° C. to 70.5° C.) | 28 |
| Recycle nitroanilines | 8 |
| Unaccounted for loss | 3 |
| | 100 |

Example 6

100 parts of a mixture containing 65 per cent of para nitroaniline and 35 per cent of its ortho isomer are mixed with 200 parts of benzene and heated at 50° C. for about 15 minutes. The solids are filtered off and washed with 50 parts of benzene held at a temperature of 50° C. The filtrate is thoroughly stirred and kept at a temperature of 55° C. while anhydrous hydrogen chloride is introduced into the solution. After the precipitate of nitroaniline hydrogen chlorides is formed, the same is collected on a filter, washed with 50 parts of warm benzene and neutralized with a solution of sodium hydroxide. The mixture of ntroanilines is filtered and recycled. The benzene filtrate is evaporated and the pure ortho nitroaniline crystals are recovered therefrom and dried. The yields obtained are as follows:

|  | Parts |
|---|---|
| Para nitroaniline (M. P.=144° C. to 146.5° C.) | 56 |
| Ortho nitroaniline (M. P.=66° C. to 68° C.) | 26 |
| Recycle nitroanilines | 16 |
| Unaccounted for loss | 2 |
|  | 100 |

It should be noted that the above outlined procedure of separating mixed isomers of ortho- and para-nitroaniline is independent of the source and physical condition of the starting material. It is applicable regardless of the form in which the mixture is provided, whether it be a wet filter cake originating from the ammonolysis of chloronitrobenzene, or a dry powder, or a solid solution, or a melt.

Likewise our new method shall not be confined to the specific solvents shown in the foregoing examples. Practically every organic agent in which the ortho isomer is preferentially soluble may be used, and in addition to those mentioned in the examples the following will serve the purpose desired: chloroform, ethylene dichloride, 1,1,2-trichloroethane, trichloroethylene, benzene, toluene, and xylene. Carbontetrachloride is a conventional solvent as it is inexpensive, noninflammable and well suited for plant operations.

It may of course, be necessary to adjust the temperatures and other operating conditions in accordance with the boiling points and varying physical characteristics of the solvent employed, and any such modification as required by the nature of the separating agent will readily occur to a chemist skilled in the art. Thus, if a low boiling solvent is used, it might be advisable to carry out the solution in a reflux condenser. In the event that the solvent has a relatively high boiling point, such as benzene or para xylene, it will be preferable to recover the ortho nitroaniline from the solution by evaporation or distillation instead of refrigerative crystallization. Again in certain cases it may be desirable to use a mixture of two or more solvents to lower the boiling point of the dissolving medium.

Although for the purpose of isolating the pure ortho nitroaniline from the organic mother filtrate the examples suggest the use of anhydrous hydrochloride, hydrochloric acid, sulfuric acid and para phenolsulfonic acid, it will be understood that many other organic and inorganic acids may be employed to the same effect. Additional examples are nitric acid, phosphoric acid, arsenic acid, benzene sulfonic acid and toluenesulfonic acid. One of our preferred embodiments is the precipitation of para nitroaniline by anhydrous hydrogen chloride, as this is an inexpensive agent which readily disperses in the stirred filtrate and gives sharp separations. The term hydrogen chloride as used in the claims shall be understood to include both the anhydrous and the aqueous form.

While the invention has been described in accordance with our preferred embodiments, it will be apparent that numerous variations and modifications may be resorted to without departing from the spirit of the invention and that all these shall be included as equivalents within the purview of our invention as defined in the following claims.

What we claim is:

1. The method of separating mixed isomers of ortho- and para-nitroaniline which comprises the steps of subjecting the isomeric mixture to the action of an organic dissolving medium of substantially selective affinity for the ortho isomer selected from the group consisting of carbontetrachloride, benzene, toluene, xylene, chloroform, ethylene dichloride, 1,1,2, trichloroethane, and trichloroethylene separating the undissolved para nitroaniline from the solution, treating the solution with an acid selected from the group consisting of anhydrous hydrogen chloride, hydrochloric acid, sulfuric acid, nitric acid, phosphoric acid, arsenic acid, benzene sulphonic acid, toluene sulphonic acid, and paraphenol sulphonic acid to form an insoluble para nitroaniline acid salt, separating said insoluble acid salt of para nitroaniline from the ortho isomer solution, and recovering the ortho nitroaniline in the remaining liquid.

2. The method of separating mixed isomers of ortho- and para-nitroanilines which comprises the steps of subjecting the isomeric mixture to the action of carbontetrachloride, separating the undissolved para nitroaniline from the solution, treating the solution with hydrogen chloride, separating the undissolved para nitroaniline hydrochloride from the ortho isomer solution and recovering therefrom the ortho nitroaniline.

3. The method of separating mixed isomers of ortho- and paranitroaniline which comprises the steps of subjecting the isomeric mixture to the action of carbontetrachloride, separating the undissolved para-nitroaniline from the solution, treating the solution with sulfuric acid, separating the undissolved paranitroaniline sulphate from the ortho isomer solution, and recovering therefrom the ortho nitroaniline.

4. The method of separating mixed isomers of ortho- and paranitroaniline which comprises the steps of subjecting the isomeric mixture to the action of carbontetrachloride, separating the undissolved para-nitroaniline from the solution, treating the solution with para-phenolsulphonic acid, separating the undissolved paranitroaniline para-phenolsulphonate from the ortho isomer solution, and recovering therefrom the ortho nitroaniline.

5. The method of separating mixed isomers of ortho- and paranitroaniline, which comprises the steps of subjecting the isomeric mixture to the action of benzene, separating the undissolved paranitroaniline from the solution, treating the solution with hydrogen chloride, separating the undissolved paranitroaniline hydrochloride from the ortho isomer solution and recovering therefrom the ortho nitroaniline.

6. The method of separating mixed isomers of ortho- and paranitroaniline, which comprises the steps of subjecting the isomeric mixture to the action of ethylenedichloride, separating the undissolved paranitroaniline from the solution, treating the solution with hydrogen chloride, separating the undissolved paranitroaniline hydrochloride from the ortho isomer solution, and recovering thereform the ortho nitroaniline.

7. The method of separating mixed isomers of ortho- and para-nitroanilines which comprises the steps of subjecting a wet isomeric mixture to the action of warm carbontetrachloride, separating the undissolved para nitroaniline from the solution, resuspending the solid para isomer in warm carbontetrachloride and filtering the same from the suspending agent, decanting the water layer from the predominantly ortho isomer solution, combining it with the first ortho-isomer solution, treating the combined solutions with hydrogen chloride, separating the undissolved para nitroaniline hydrochloride from the liquid, and recovering therefrom pure ortho nitroaniline.

8. The method of separating mixed isomers of ortho- and paranitroaniline which comprises the steps of subjecting the isomeric mixture to the action of an organic dissolving medium of substantially selective affinity for the ortho-isomer selected from the group consisting of carbontetrachloride, benzene, toluene, xylene, chloroform, ethylene dichloride, 1,1,2-trichloroethane, and trichloroethylene separating the undissolved para-nitroaniline from the solution, treating the solution with an acid selected from the group consisting of anyhdrous hydrogen chloride, hydrochloric acid, sulfuric acid, nitric acid, phosphoric acid, arsenic acid, benzene sulphonic acid, toluene sulphonic acid, and paraphenol sulphonic acid to form an insoluble acid salt of predominantly para-nitroaniline, separating said acid salt from the solution, washing and neutralizing the separated solid, returning the same to the starting mixture of the isomers, and recovering the ortho-nitroaniline from the remaining liquid.

THOMAS W. ZBORNIK.
DEAN J. SLAGLE.

References Cited in the file of this patent
UNITED STATES PATENTS

| Number | Name | Date |
|---|---|---|
| 2,128,699 | Frye | Aug. 30, 1938 |
| 2,408,975 | Engel | Oct. 8, 1946 |